Dec. 9, 1930.                W. R. McNABB ET AL                1,784,018
PISTON EXPANDER
Filed March 12, 1927

INVENTORS.
WILLIAM R. McNABB.
WILLIAM D. FARLEY.
FERRELD J. STARCHER.
BY.
H. R. Druckman
ATTORNEY.

Patented Dec. 9, 1930

1,784,018

UNITED STATES PATENT OFFICE

WILLIAM R. McNABB, WILLIAM D. FARLEY, AND FERRELD J. STARCHER, OF LONG BEACH, CALIFORNIA

PISTON EXPANDER

Application filed March 12, 1927. Serial No. 174,762.

An object of our invention is to provide a piston expander which will evenly expand the piston; that is, which will expand it to a circular shape.

Another object of our invention is to provide a piston expander which can be operated more rapidly than similar devices heretofore in use and which is simple in construction and inexpensive to manufacture.

Other objects, advantages, and features of invention may appear from the accompanying drawing, the subjoined detailed description, and the appended claim.

In the drawing—

Figure 1:
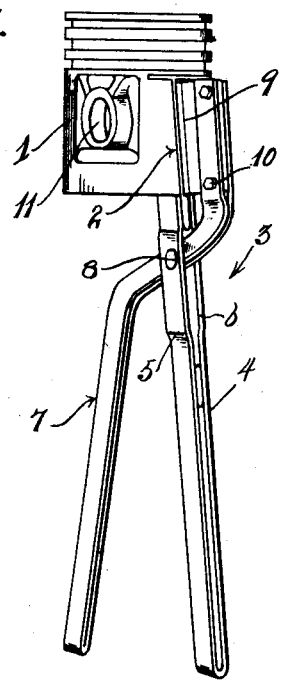
Fig. 1 is a perspective view of our expander about to be inserted in the piston slot to expand the piston.
Figure 2:
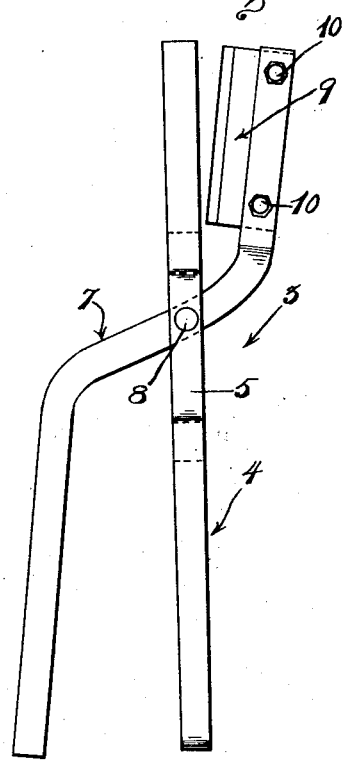
Fig. 2 is a side elevation of our expander.

Referring more particularly to the drawing:

Our expander is adapted to be used upon pistons as shown at 1, which have a slot 2 formed in the skirt thereof. It will be evident that by inserting an expanding element into the slot 2 when the piston is heated that an expansion of the same will result.

Figure 3:
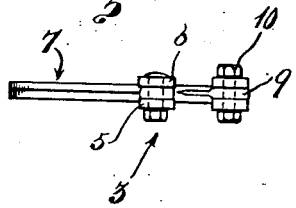
Fig. 3 is a plan view of the same.

Our piston expander 3 comprises an arm 4 preferably formed of a single strip of metal bent upon itself to provide spaced arms 5, 6. The upper ends of the arms 5, 6 are spaced apart, as is shown in Fig. 3, and said arms are adapted to bear against the inside of the piston 2. A second arm 7, also preferably formed of a single strip of metal bent upon itself, is pivoted, as at 8, between the arms 5. 6. A wedge plate 9 is removably mounted to the upper end of the arm 7 between the two halves thereof by means of bolts 10, 10, or the like. The wedge plate 9 is adapted to extend between the arms 5, 6 when in closed position and said plate is adapted to be forced through the slot 2 to extend the same and expand the piston.

In operation the piston 1 is heated to the desired temperature and the arm 4 is placed inside of the piston with the plate 9 over the slot 2. By moving the arms 4, 7 together the wedge plate 9 is forced through the slot 2 to extend the same. The arms 5, 6 bear against the inside of the piston while the upper end of the arm 7 bears against the outside thereof, and by pressing these members tightly together the piston 1 is prevented from warping or distorting in shape. The plate 9 being removable it will be apparent that different sized plates may be inserted to expand the piston the necessary amount.

To facilitate removal of our expander from the piston we may insert a pin (not shown) in the wrist-pin bearings 11 so that the arms 5, 6 will bear against the same when the expander is desired to be removed, thus forcing the plate 9 out of the slot 2.

Having described our invention, we claim:

A piston expander adapted to expand pistons having a slot formed therein, said expander comprising a pair of spaced arms formed from a single strip of metal, a second arm formed of a single strip of metal bent upon itself, said last named arm being pivoted between the first named spaced arms, a wedge plate adapted to be secured to said last named arm, and bolts extending through said last named arm and wedge plate whereby the plate is secured in position.

In testimony whereof, we affix our signatures.

WILLIAM R. McNABB.
WILLIAM D. FARLEY.
FERRELD J. STARCHER.